March 1, 1932.  G. INNES  1,847,399
MEANS FOR HANDLING DETACHED VEGETABLE MATTER
Filed June 28, 1929   3 Sheets-Sheet 1
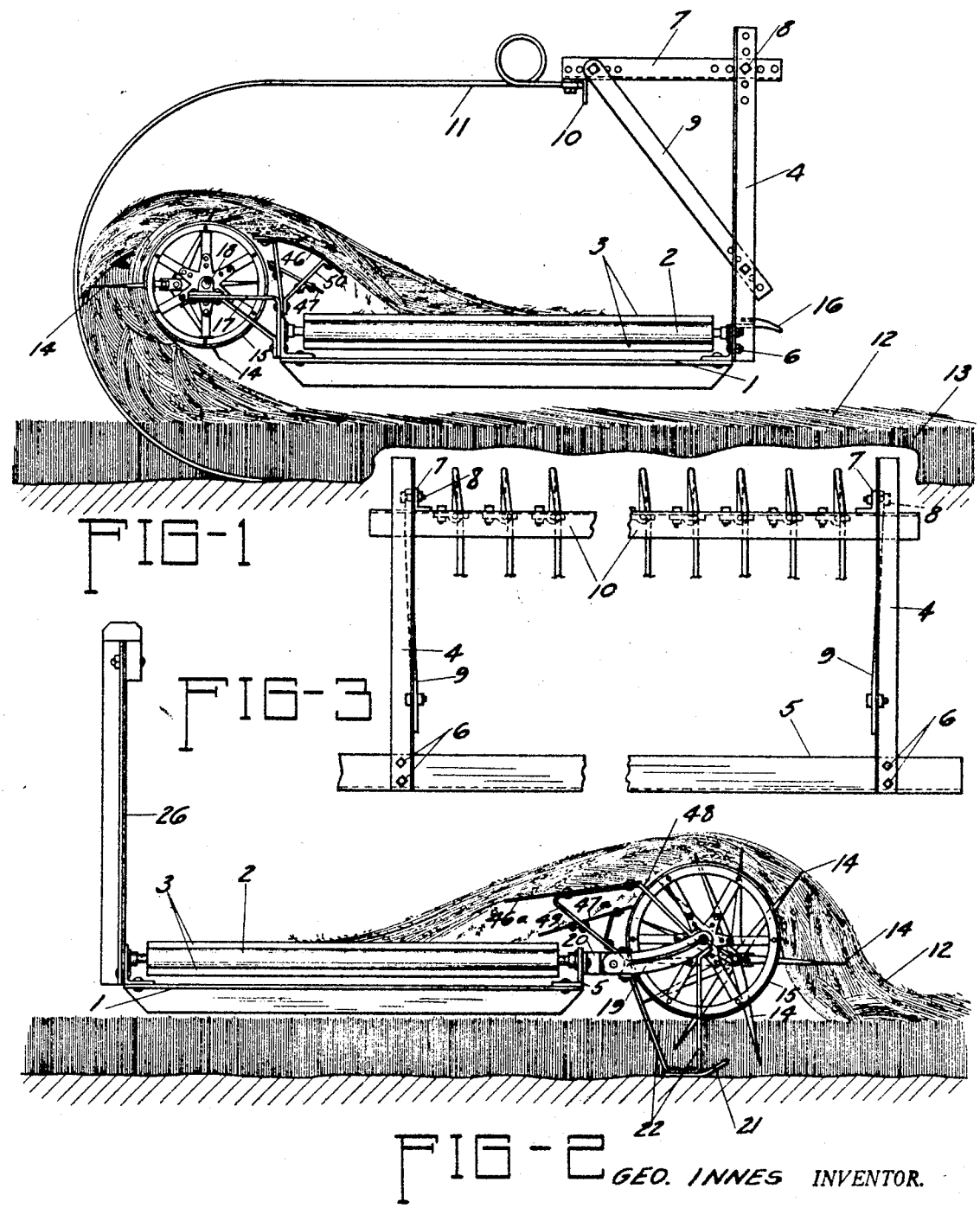

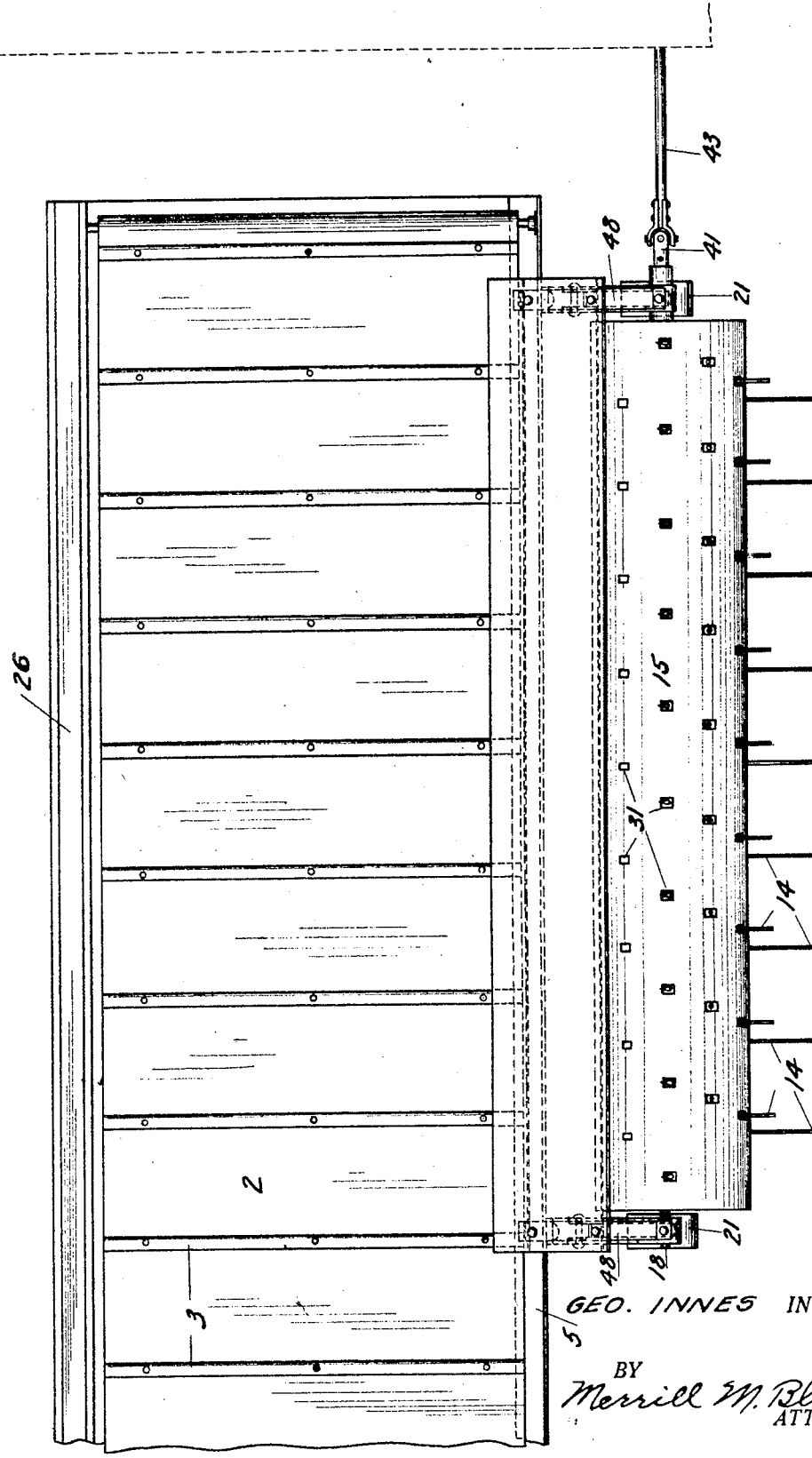

March 1, 1932. G. INNES 1,847,399
MEANS FOR HANDLING DETACHED VEGETABLE MATTER
Filed June 28, 1929   3 Sheets-Sheet 3
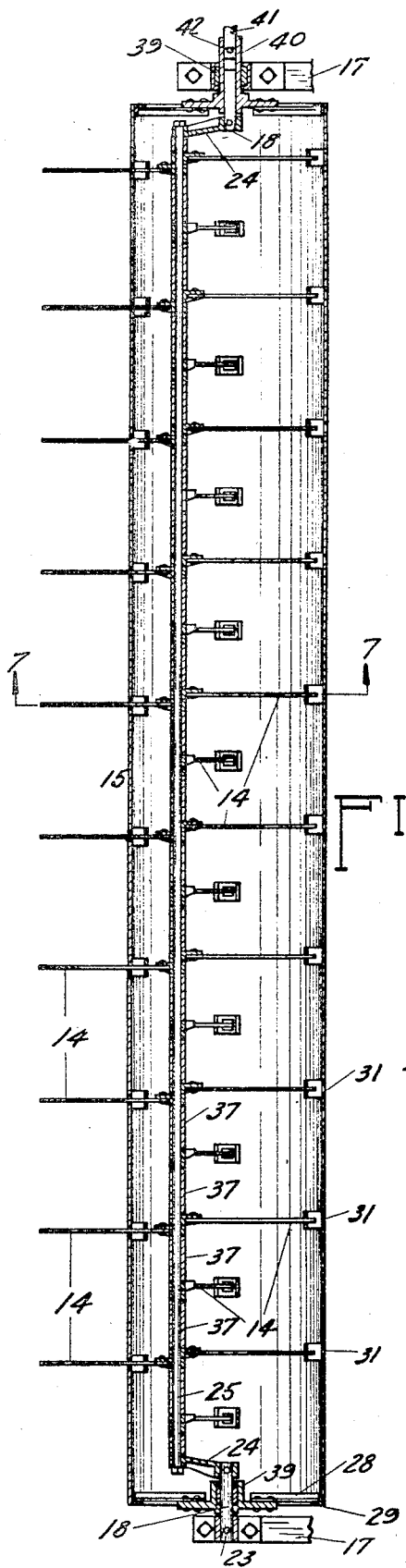
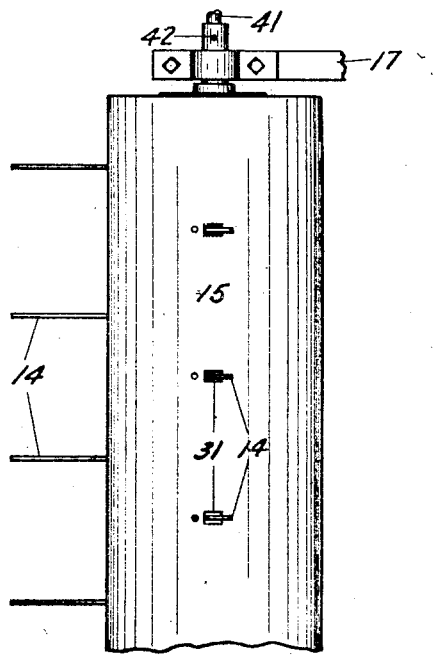
FIG-6
FIG-5
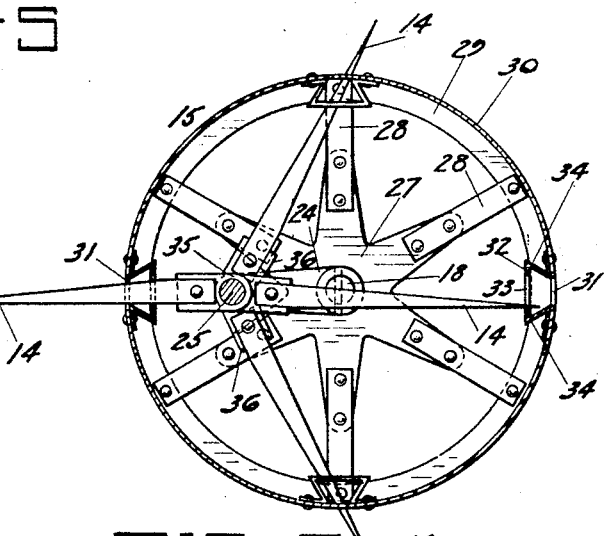
FIG-7
GEO. INNES  INVENTOR.
BY
Merrill M. Blackburn
ATTORNEY Patented Mar. 1, 1932

1,847,399

UNITED STATES PATENT OFFICE

GEORGE INNES, OF DAVENPORT, IOWA, ASSIGNOR TO INNES MANUFACTURING COMPANY, OF BETTENDORF, IOWA, A CORPORATION OF DELAWARE

MEANS FOR HANDLING DETACHED VEGETABLE MATTER

Application filed June 28, 1929. Serial No. 374,545.

The present invention relates to mechanism for handling detached vegetable matter of a more or less fibrous nature, being designed more especially for use with grain shockers, combines, hay loaders, corn stalk loaders, and the like.

The present invention relates to mechanism for use in an apparatus such as disclosed in my prior U. S. application Serial No. 170,526, filed February 24, 1927, and to other somewhat similar devices. In reality, the present application is a continuation of the above identified application, as to all matter common to the two.

In this specification and the appended claims, the term "grain" will, for the sake of brevity, be used in a broad sense to include not only grain in the ordinary sense, but also hay, corn stalks, sugar cane, rice, and the like.

In the past, various methods and mechanisms have been used for picking up and handling grain and similar commodities, as specified above, but none of those prior to my construction have been entirely satisfactory, for one reason or another. For example, in some types of grain pickups the teeth of the pickup mechanism would strike obstacles, such as stones, and either pick them up and deliver them with the grain or, possibly, be injured by reason of the impact with the stone. In one type of construction, the teeth were carried on a belt, apron, or the like, traveling in such a direction that the rate of travel of the teeth, relatively to the ground and objects thereon, was equal to the sum of the rate of forward travel of the machine plus the rate of travel of the teeth themselves with relation to the machine. Also, as the belt or apron reached the forward part of its course of travel and turned around the front edge of the machine to start back on top and carry the grain with it, the ends of the teeth were traveling around in a substantially vertical circle and traveling at a rate considerably greater than the sum spoken of above. The result of this has been that these teeth would strike obstacles with a considerable impact, resulting in the breaking or bending of the teeth and, possibly, injury to the machine as a whole. In the constructions of the prior art various provisions have been made for detaching the vegetation from the teeth of the mechanism that picks up and proposes to release the detached vegetation, such, for example, as tilting the teeth at or about the time they have reached the discharge position, or of using reverse raddles in connection with said tilting or rollers or strips of metal inserted between the teeth, thus attempting to remove the vegetation, but these efforts have been only partially successful and considerable grain has been lost by being carried along with the teeth or by being dropped inside the mechanism carrying the teeth, there to clog the mechanism and often causing it to break. These all having failed to be as effective as might be desired, I have therefore produced the present construction, in an effort to reduce grain losses and breakage of mechanism, as well as to produce a device that is more desirable in other respects than prior constructions. Furthermore the cam action which is employed, together with gears in other constructions, for the tilting of the teeth, must again be employed to restore the teeth to an engaging position. This causes them to be moved unduly fast at the point of picking up the grain, thus tending to thresh the grain out of the hulls and cause loss thereof. The motion of the teeth at such time is made up of the following elements: the forward travel of the machine, the forward travel of the teeth with relation to the machine and the forward travel, or whip, of the teeth in moving from a rearwardly inclined to a position normal to the carrying means for the teeth, or inclined forwardly somewhat from that position. My present invention has very largely obviated these difficulties and has resulted in the production of a much lighter and better machine.

Among the objects of my invention are therefore, to provide an improved mechanism for picking up detached grain and transferring it to another point to be further handled by another mechanism; to provide improved mechanism for the handling of either loose or bundled grain; to provide a mechanism for the purpose indicted which will be of light weight and yet will be strong and efficient for the purpose intended; to provide improved means for the handling of either loose or bundled grain which will serve either as means for picking the grain up from the field or handling the same after it has been picked up by other mechanisms; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of my invention, I desire the same to be understood as illustrative only and not to be construed in a limiting sense.

In the drawings annexed hereto and forming a part hereof, Fig. 1 shows my invention applied to one form of pickup mechanism, the same serving to receive the grain and transfer it from one place to another; Fig. 2 is another view showing the application of substantially the same mechanism to the front instead of the rear of a platform; Fig. 3 is a fragmentary elevation of the front part of the structure shown in Fig. 1, illustrating the frame which supports a part of the pickup mechanism; Fig. 4 is a plan view of a construction such as shown in Fig. 2, illustrating the application of my invention to the front edge of the platform; Fig. 5 is a nearly horizontal longitudinal section through a construction embodying my improvement; Fig. 6 is a fragmentary plan view of a portion of this device; Fig. 7 is a vertical section taken substantially along the broken plane indicated by the line 7—7 Fig. 5.

Reference will now be made in more detail to the annexed drawings in which numeral 1 denotes the platform and 2 the apron of an ordinary machine for harvesting grain, for example, a combine. As is customary, the apron is provided with slats 3 which are secured to the apron and travel therewith in moving the grain from the point where it is received to another point. This is old structure and needs no further description.

Reference will now be made to Fig. 1 in particular in which the platform 1 is shown as having uprights 4 secured to the front plate 5, preferably detachably, by means of bolts 6. The upper ends of the uprights 4 have angles 7 extending rearwardly, therefrom, these parts being held together by bolts 8 and braced by means of the braces 9. The rear ends of the angles 7 are connected together by an angle 10 upon which are mounted the resilient teeth 11, quite similar in general form and operation to rake teeth. In this figure, the grain 12 is shown as resting upon the top of stubbles 13. As the spring teeth 11 are drawn along the ground, they pick up the grain and lift it up somewhat as shown at the left in Fig. 1. The teeth 14 of the pickup mechanism are projected through the casing of the rotary cylinder 15 and engage the grain, causing it to be carried forward over the cylinder and delivered on to the apron 2.

Reference will next be made to Fig. 2 for the description of such parts as are shown therein which differ from the construction shown in Fig. 1. In the construction just described, the pickup mechanism is located at the rear edge of the platform 1 and delivers the grain forwardly in a reversed position from that which it occupied on the ground. In Fig. 2 the pickup mechanism is shown as mounted at the forward edge of the platform 1 and as delivering the grain to the platform without reversal. At the rear edge of the platform is a wind guard 26 to prevent the wind from blowing the grain off the apron. In mounting either type of construction upon the forward edge of the platform it is necessary to remove certain sections of the guard teeth 16 to make room for the mechanism. This does no harm as the machine when used for this purpose has the sickle removed and is not operating as a harvester. In connection with this description, reference may also be made to Fig. 4 in which the same structure is shown. In this figure, the guard teeth are all omitted from the front rail of the platform. Inasmuch as the sickle and reel have no use when the pickup is being used, they are preferably both removed before attaching the pick-up.

In Fig. 1 arms or brackets 17 extend rearwardly from the rear edge of the platform and support axles 18 upon which the cylinder 15 rotates. These brackets are rigidly connected with the frame of the platform and therefore hold the axles 18 rigidly with relation thereto. In the construction shown in Fig. 2, arms 19 are pivotally connected with short brackets 20 which are in turn secured to the front edge of the platform. Shoes 21 are rigidly connected by brackets 22 with the arms 19 and therefore hold the pickup drum at a fixed elevation above the ground, the shoes sliding along the surface thereof as the machine travels forwardly. The axles 18 are mounted in the arms 19 and support the drum 15 therefrom as in the case of the previously described construction. As indicated at 23, one axle 18 is rigidly secured to the arm or bracket 17 so that the axle can not rotate. To the inner end of this axle is keyed or otherwise rigidly secured the bracket arm 24 which supports one end of a rod 25 upon which the pickup arms are mounted for rotation. These arms 24 are shown as being substantially horizontally positioned so that the pickup points 14 will be projected farther through the wall of the drum 15 upon that side where the greatest amount of work is to be done. In the construction shown in Fig. 2, however, the bracket arms 24 extend downwardly somewhat in order to project the teeth more in a downward direction to get under and pick up the grain 12.

The drum or rotary cylinder 15 comprises a cylindrical element 30 and a pair of spiders 27, one at each end, having arms 28 to which are secured rings 29, which latter are secured to the ends of the cylindrical element 30. The cylindrical element has a series of perforations 31 therethrough. Each perforation has a guide 32 secured on the interior of the element 30 adjacent the opening. These guides have openings 33 therein through which extend the pickup arms 14. The sides 34 of the guides are shown as inclined inwardly toward the openings 31 and they therefore serve as guides to direct the points of the arms 14 through the openings 31. Collars 35 are provided with arms 36 to which the pickup arms 14 are secured. These collars are mounted on the rod 25 and are separated from each other by spacing sleeves 37. These sleeves keep the collars properly spaced along this rod.

The spider 27 at one end of the drum 15 has an inwardly extending sleeve in which is mounted a bearing 39 which sustains this end of the drum upon the axle 18 and permits the drum to rotate thereon with very little friction. The spider at the opposite end of the drum has an outwardly extending sleeve 40, between which and the arm 17 is a bearing 39. The sleeve 40 therefore turns within the bearing 39 and about the axle 18, at this end of the construction. A shaft 41 is pinned or otherwise suitably secured to the sleeve 40 as indicated at 42 and this shaft is flexibly connected to a shaft 43 to which power is supplied from any suitable source, such as the hull wheel of the machine or the power plant which drives it. It will be seen from the foregoing that since the axles 18 are non-rotatable and the bracket arms 24 are therefore held in fixed position, the bar 25 must necessarily be held in substantially fixed position. The result of this and of the rotation of the drum 15 about the axles 18 is that the pickup arms 14 are withdrawn from the side of the drum more remote from the bar 25 and are projected outwardly farther on the side where the drum is nearest to the bar 25, the pickup arms projecting, in intermediate positions, different amounts, depending upon the position of the drum. Figs. 1 and 2 show most clearly that the pickup arms are projected farthest in the lifting position and that when they pass this they are gradually withdrawn until, upon the opposite side of the drum, they are entirely within the periphery thereof. This permits them to clear the edges of the tables 46, 47, 46a and 47a, and release all the loose grain they may be conveying so that none of it will be carried back in the direction from which it was taken. Suitable brackets 48, 49 and 50 support these tables above the space between the drum 15 and the platform 1. The longer portions of the grain will pass over the upper table and be delivered to the apron 2, while the shorter portions which pass between the upper table and the drum 15 will have a tendency to be received by the lower table and delivered to the apron. In the present construction, the grain carrying parts of the pickup all revolve in the same direction as the substance being handled is supposed to travel and there is therefore no resistance within the machine itself due to backward travel or stationary position of a part thereof.

In the present disclosure there are shown two modes of utilization of this invention while in my prior application Serial No. 170,526 there is disclosed another mode of utilization. Because still other modes are possible, I do not wish to be limited to the precise construction shown, desiring that this disclosure be understood as illustrative only.

From the foregoing it will be apparent that I have devised a construction which is simple to build, light in weight, easily applied in position for operation, and is efficient for the purpose intended.

Having now described my invention, I claim:

1. In mechanism for handling detached vegetation, an apron for receiving the detached vegetation, in combination with means for moving said vegetation from one place to another, including a rotatable conveying wheel disposed adjacent the said apron and cooperating therewith, said wheel having a rim provided with spaced apertures, and rotatable means connected to the axle of the wheel for rotating same, a fixed axle within the wheel disposed eccentrically with respect to the wheel axis, and pins rotatable about said last named axle, said pins being slidable through said rim apertures and being engageable with the vegetation to cause the same to be advanced in its course and delivered to the apron.

2. In a mechanism for the purpose indicated, a platform, a conveyor apron associated with said platform for conveying loose vegetation, a rotary wheel cooperating with the apron in the handling of the vegetation, said wheel having means forming a part thereof and rotating therewith to assist in the actuation of the vegetation, said last named means being capable of being projected from or drawn into the wheel to assist in actuating the vegetation and said wheel lifting the vegetation from a lower elevation and placing it upon the apron.

3. In a machine for the purpose indicated, a platform, an apron traveling above said platform, a rotatable drum mounted adjacent one edge of the platform, a crank-shaped axle within said drum, the drum being supported on the axle adjacent the ends thereof, the intermediate portion of the axle being eccentric with relation to the ends thereof and being non-rotatably mounted, said eccentric portion of the axle carrying arms mounted thereon for rotation thereabout, the drum being rotatable about the axle and thus turning the arms about the eccentric portion of the axle, when it rotates, in combination with arms mounted above the apron and extending rearwardly, downwardly and forwardly substantially into engagement with the ground to cooperate with the drum in placing grain upon the apron.

4. In a structure for the purpose indicated, a crank having its middle portion offset with relation to its ends and continuous between said ends, means for non-rotatably supporting said crank, a drum supported upon the two ends of the crank and rotatable about the same, said drum having perforations through its surface, an apron, arms mounted upon the offset portion of the crank, rotatable about the same and capable of being reciprocated through the perforations in the drum, to be projected from the surface thereof and withdrawn into the drum, and a table over the space between the drum and apron to guide the grain from the former to the latter.

5. In a grain pick-up machine, means for receiving grain, comprising a platform and a travelling apron carried thereby and moving with relation thereto, in combination with a means for imparting a moving force to said grain, said last named means including a rotatable cylinder having perforations through its cylindrical surface, a fixed axle within the cylinder, located eccentrically to the cylinder axis and extending entirely through the cylinder, means mounted upon the eccentric axle and projectable through the wall of the cylinder and into engagement with the grain, and means for rotating the cylinder about its axis, the projecting means being caused by such rotation to rotate about the eccentric axle and to be projected from and withdrawn into the cylinder, said force imparting means causing the grain to be deposited upon the apron, the force imparting means rotating in a direction to cause the grain to be picked up and carried over said means on its way to the apron.

6. In a structure of the nature indicated, a supporting framework, an apron carried thereby and moving with relation thereto, said apron being adapted to receive and transport grain, a rotary pick-up device carried by the framework and delivering grain picked up thereby to the apron, long spring fingers carried by the framework and having free ends which engage the ground below the framework, said spring fingers picking up grain and delivering it to the rotary pick-up device to be delivered thereby to the apron.

In witness whereof, I hereunto subscribe my name to this specification.

GEORGE INNES.